United States Patent
Akuzawa et al.

(10) Patent No.: US 9,871,416 B2
(45) Date of Patent: Jan. 16, 2018

(54) RESONANT TYPE HIGH FREQUENCY POWER SUPPLY DEVICE

(71) Applicant: Mitsubishi Electric Engineering Company, Limited, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 0 days.

(21) Appl. No.: 15/030,949

(22) PCT Filed: Oct. 31, 2013

(86) PCT No.: PCT/JP2013/079549
§ 371 (c)(1),
(2) Date: Apr. 21, 2016

(87) PCT Pub. No.: WO2015/063920
PCT Pub. Date: May 7, 2015

(65) Prior Publication Data
US 2016/0254702 A1  Sep. 1, 2016

(51) Int. Cl.
*H02J 50/12* (2016.01)
*H02M 7/48* (2007.01)
*H02J 50/20* (2016.01)

(52) U.S. Cl.
CPC .............. *H02J 50/12* (2016.02); *H02M 7/48* (2013.01); *H02J 50/20* (2016.02);
(Continued)

(58) Field of Classification Search
CPC ............ H02J 50/20; H02J 50/12; H02J 50/23; Y02B 70/1441; Y02B 70/1491;
(Continued)

(56) References Cited

U.S. PATENT DOCUMENTS

| | | | | |
|---|---|---|---|---|
| 2005/0135129 A1* | 6/2005 | Kazutoshi | ............... | H02J 5/005 363/98 |
| 2008/0204247 A1* | 8/2008 | Lian | ..................... | G06K 7/0008 340/572.3 |

(Continued)

FOREIGN PATENT DOCUMENTS

| | | |
|---|---|---|
| JP | 55-21861 A | 2/1960 |
| JP | 60-177596 A | 9/1965 |

(Continued)

OTHER PUBLICATIONS

Japanese Office Action dated Sep. 5, 2017 in Japanese Patent Application No. 2015-544718 (with unedited computer generated English translation).

(Continued)

*Primary Examiner* — Gustavo Rosario Benitez
(74) *Attorney, Agent, or Firm* — Oblon, McClelland, Maier & Neustadt, L.L.P.

(57) ABSTRACT

A resonant type high frequency power supply device provided with a power semiconductor element that performs a switching operation at a high frequency exceeding 2 MHz, the resonant type high frequency power supply device including a variable inductor that makes an adjustment to the amplitude of a device output voltage.

5 Claims, 7 Drawing Sheets

(52) U.S. Cl.
CPC ............... *H02M 2007/4815* (2013.01); *H02M 2007/4818* (2013.01); *Y02B 70/1441* (2013.01)

(58) Field of Classification Search
CPC ............... H02M 7/53832; H02M 7/48; H02M 2007/4818; H02M 3/155; H02M 3/337; H02M 2007/4815; H02M 7/533; H02M 7/537; H02M 2001/0058
See application file for complete search history.

(56) References Cited

U.S. PATENT DOCUMENTS

| | | | |
|---|---|---|---|
| 2010/0184371 A1* | 7/2010 | Cook | H02J 5/005 455/41.1 |
| 2011/0049997 A1 | 3/2011 | Urano | |
| 2013/0257370 A1* | 10/2013 | Ichikawa | H02J 5/005 320/108 |
| 2014/0253029 A1 | 9/2014 | Uchida et al. | |
| 2014/0368056 A1 | 12/2014 | Hosotani | |
| 2015/0061579 A1 | 3/2015 | Katsunaga | |

FOREIGN PATENT DOCUMENTS

| | | |
|---|---|---|
| JP | 55-17262 A | 2/1980 |
| JP | 7-107393 A | 4/1995 |
| JP | 8-163792 A | 6/1996 |
| JP | 2002-536629 A | 10/2002 |
| JP | 2004-103840 A | 4/2004 |
| JP | 2008-91433 A | 4/2008 |
| JP | 2010-178608 A | 8/2010 |
| JP | 2011-078299 A | 4/2011 |
| JP | 2012-235050 A | 11/2012 |
| JP | 2013-027129 A | 2/2013 |
| WO | 2013/080285 A1 | 6/2013 |
| WO | 2013/133028 A1 | 9/2013 |
| WO | 20131133028 A1 | 9/2013 |

OTHER PUBLICATIONS

Office Action dated Feb. 23, 2017 in Japanese Patent Application No. 2015-544718 (with unedited computer generated English translation).

Tamotsu Inaba, "Transistor Technology", Chapter 13, Feb. 2005, (2 pages).

International Search Report dated Jan. 28, 2014 for PCT/JP2013/079549 filed on Oct. 31, 2013.

* cited by examiner

RESONANT TYPE HIGH FREQUENCY POWER SUPPLY DEVICE

FIELD OF THE INVENTION

The present invention relates to a resonant type high frequency power supply device that performs power transmission at a high frequency.

BACKGROUND OF THE INVENTION

A conventional resonant type high frequency power supply device shown in FIG. 8 is configured in such a way as to make an adjustment to the amplitude of an output voltage Vout by making an adjustment to the capacitance of a variable capacitor C2 (for example, refer to nonpatent reference 1).

RELATED ART DOCUMENT

Nonpatent Reference

Nonpatent reference 1: Transistor Technology, February 2005, Chapter 13

SUMMARY OF THE INVENTION

Problems to be Solved by the Invention

However, a problem with the conventional technology disclosed by nonpatent reference 1 is that the variable capacitor C2 is used in order to make an adjustment to the amplitude of the output voltage Vout, and hence the component is upsized and this results in an increase in the cost. A further problem is that this variable capacitor has a large variation in its capacitance value due to a temperature change, and it is difficult to maintain its stable performance, for example, the variable capacitor is vulnerable to mechanical shocks.

The present invention is made in order to solve the above-mentioned problems, and it is therefore an object of the present invention to provide a resonant type high frequency power supply device that makes an adjustment to the amplitude of an output voltage without using a variable capacitor, thereby achieving downsizing thereof and a cost reduction, and that is superior in its resistance to a temperature change and a mechanical environment, and can maintain stable performance and operate at a high frequency exceeding 2 MHz.

Means for Solving the Problem

In accordance with the present invention, there is provided a resonant type high frequency power supply device provided with a power semiconductor element that performs a switching operation at a high frequency exceeding 2 MHz, the resonant type high frequency power supply device including a variable inductor that makes an adjustment to the amplitude of a device output voltage.

Advantages of the Invention

Because the resonant type high frequency power supply device in accordance with the present invention is configured as above, the resonant type high frequency power supply device makes an adjustment to the amplitude of the output voltage without using a variable capacitor, thereby achieving downsizing thereof and a cost reduction, and is superior in its resistance to a temperature change and a mechanical environment and can maintain stable performance and operate at a high frequency exceeding 2 MHz.

Hereafter, the preferred embodiments of the present invention will be explained in detail with reference to the drawings.

Embodiment 1

Figure 1:
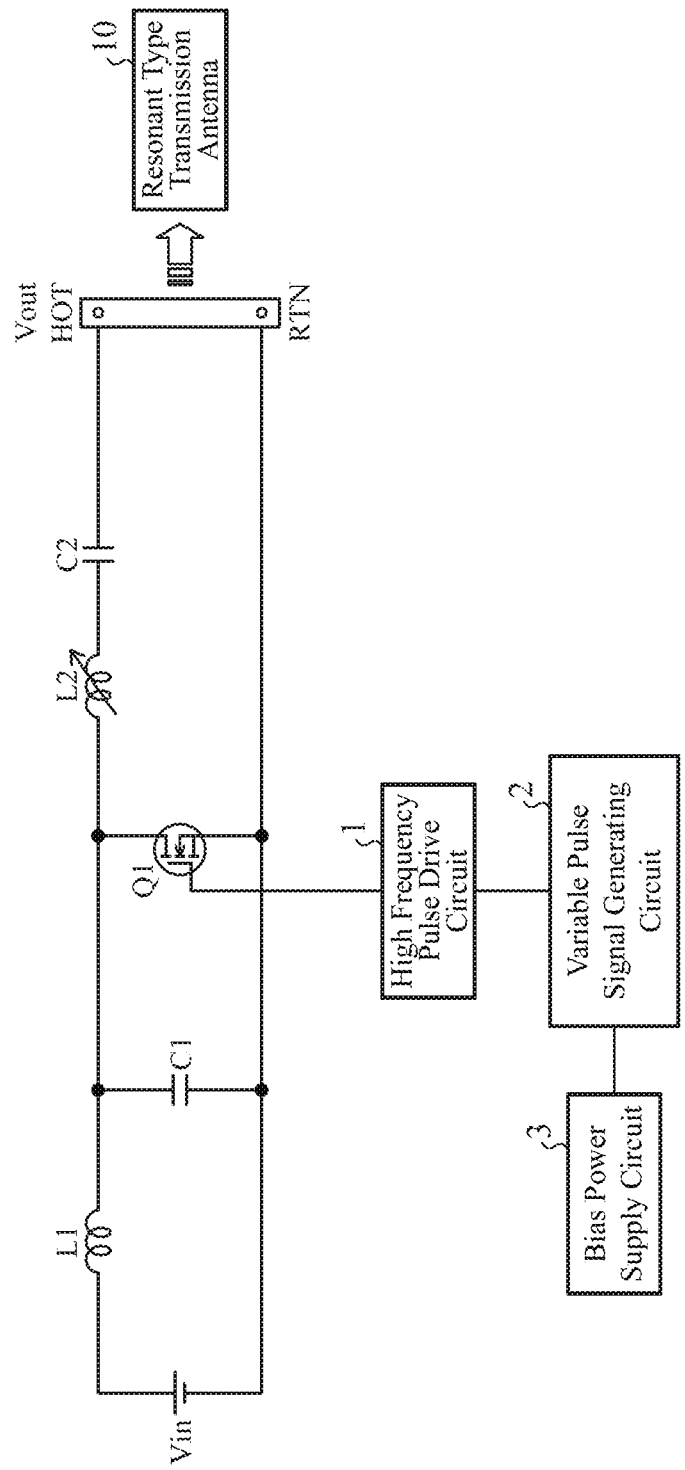
FIG. 1 is a diagram showing the configuration of a resonant type high frequency power supply device in accordance with Embodiment 1 of the present invention (in a case in which a power semiconductor element has a single configuration)

FIG. 1 is a diagram showing the configuration of a resonant type high frequency power supply device in accordance with Embodiment 1 of the present invention. In FIG. 1, a power semiconductor element Q1 represents a circuit in a case of a single configuration.

The resonant type high frequency power supply device is comprised of the power semiconductor element Q1, a resonance circuit element (capacitors C1 and C2 and an inductor L2), an inductor L1, a high frequency pulse drive circuit 1, a variable pulse signal generating circuit 2 and a bias power supply circuit 3, as shown in FIG. 1.

A resonant type transmission antenna (a transmission antenna for power transmission) 10 is a resonant type antenna for power transmission having LC resonance characteristics (which is not limited only to a noncontact type one). This resonant type transmission antenna 10 can be of any of magnetic resonance type, electric resonance type, and electromagnetic induction type.

The power semiconductor element Q1 is a switching element that performs a switching operation in order to convert a direct voltage Vin, which is an input, into an alternating voltage. As this power semiconductor element Q1, not only an FET for RF but also an element, such as an Si-MOSFET, an SiC-MOSFET or a GaN-FET, can be used.

The resonance circuit element (the capacitors C1 and C2 and the inductor L2) is an element that causes the power semiconductor element Q1 to perform resonant switching in the switching operation. By using this resonance circuit element which consists of the capacitors C1 and C2 and the inductor L2, the resonance condition can be matched to that of the resonant type transmission antenna 10. Further, the inductor L2 is an element of variable inductance value (L value) type. By causing the L value of the inductor L2 to be variable, the voltage amplitude of the output voltage Vout of the resonant type high frequency power supply device can be set to an arbitrary value.

Figure 2:
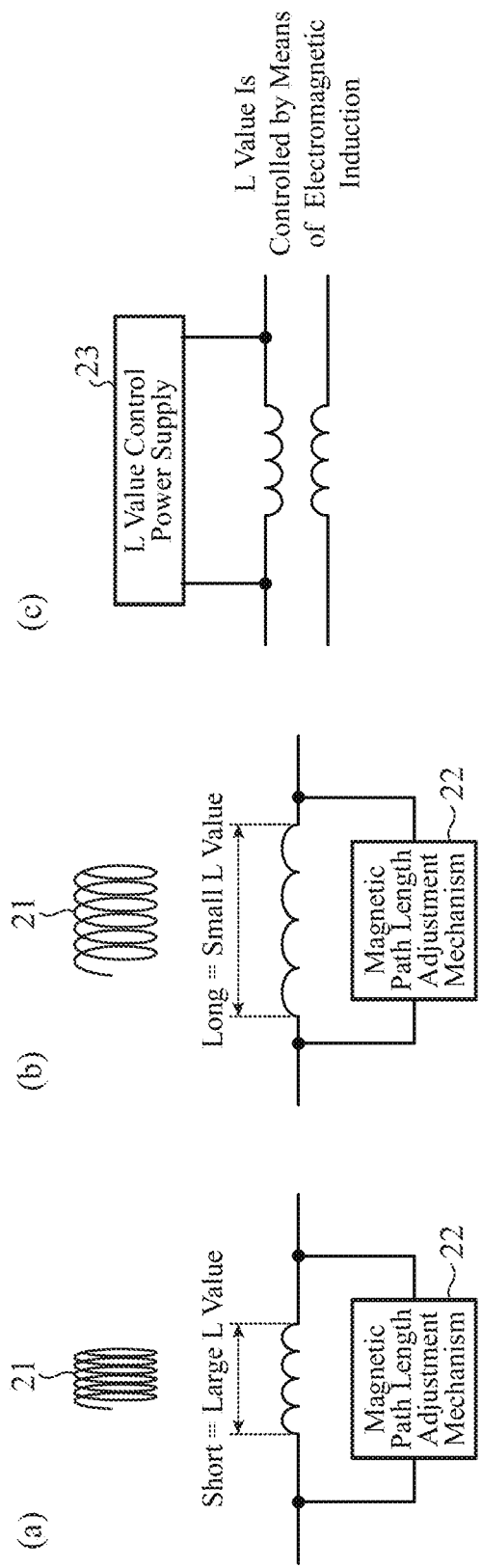
FIG. 2 is a diagram showing the configuration of a variable inductor of the resonant type high frequency power supply device in accordance with Embodiment 1 of the present invention.
Figure 3:
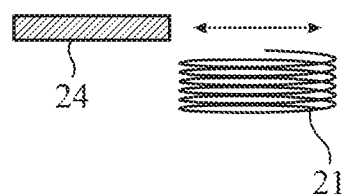
FIG. 3 is a diagram showing another example of the configuration of the variable inductor of the resonant type high frequency power supply device in accordance with Embodiment 1 of the present invention.

In this embodiment, as the configuration of the variable inductor L2, for example, there can be provided configurations shown in FIGS. 2 and 3.

FIG. 2 shows the variable inductor L2 which is of a type that manually or automatically causes the magnetic path length (the L value) of a coil 21 to be variable. In FIG. 2, the number of turns of the coil 21 is the same. FIGS. 2(a) and 2(b) show a case in which the magnetic path length (the L value) of the coil 21 is caused to be variable by means of a magnetic path length adjustment mechanism (a mechanism that manually causes the magnetic path length to be variable or automatically causes the magnetic path length to be variable by using a motor) 22, and FIG. 2(c) shows a case in which the L value is caused to be variable by electromagnetic induction using an L value control power supply 23.

Further, FIG. 3 shows the variable inductor L2 which is of a type that includes a magnetic material 24 disposed on a plane of projection of the coil 21. The coil 21 shown in FIG. 3 is formed in a spiral shape by using a pattern of a printed circuit board. In this variable inductor L2, the L value can be adjusted by varying the area that covers the plane of projection of the coil 21.

The inductor L1 works to hold the energy of the DC input voltage Vin temporarily, every time when the power semiconductor element Q1 performs the switching operation.

The high frequency pulse drive circuit 1 is a circuit that transmits a pulse-shaped voltage signal at a high frequency exceeding 2 MHz to a G terminal of the power semiconductor element Q1, to drive the power semiconductor element Q1. This high frequency pulse drive circuit 1 is a circuit which is provided a totem pole output circuit by using an FET or such a device to be able to perform a high-speed ON/OFF output.

The variable pulse signal generating circuit 2 is a circuit that transmits a pulse-shaped voltage signal having a high frequency exceeding 2 MHz, such as a logic signal, to the high frequency pulse drive circuit 1, to drive the high frequency pulse drive circuit 1. This variable pulse signal generating circuit 2 is comprised of an oscillator for frequency setting and logic ICs such as an inverter and a flip-flop, and has functions such as a function of changing a pulse width and a function of outputting reverse pulses.

The bias power supply circuit 3 supplies driving power to both the variable pulse signal generating circuit 2 and the high frequency pulse drive circuit 1.

Next, the operation of the resonant type high frequency power supply device configured as above will be explained.

First, the input direct voltage Vin is applied to a D terminal of the power semiconductor element Q1 through the inductor L1. The power semiconductor element Q1 then converts the voltage into a positive voltage in an alternating form by performing the ON/OFF switching operation. At the time of this conversion operation, the inductor L1 works to hold the energy temporarily, thereby helping the conversion of the direct voltage to the alternating voltage.

In this embodiment, in the switching operation of the power semiconductor element Q1, in order to minimize a switching loss due to the product of an Ids current and a Vds voltage, the resonant switching condition is set to conduct a ZVS (zero voltage switching) to the resonance circuit device which consists of the capacitors C1, C2 and the inductor L2. By performing this resonant switching operation, the alternating voltage centered on an RTN voltage is outputted as an output voltage Vout.

Figure 4:
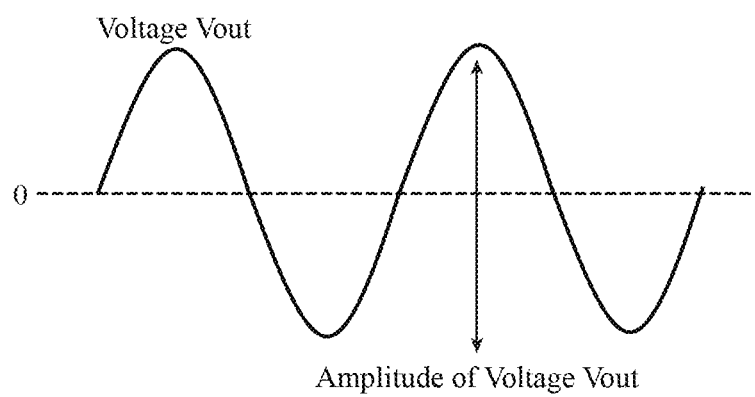
FIG. 4 is a diagram showing the waveform of Vout in the resonant type high frequency power supply device in accordance with Embodiment 1 of the present invention.

Further, by adjusting the L value of the variable inductor L2, the voltage amplitude of the output voltage Vout can be set to an arbitrary value, as shown in FIG. 4.

The driving of the power semiconductor element Q1 is performed by inputting the pulse-shaped voltage signal, which the high frequency pulse drive circuit 1 which has received the arbitrary pulse-shaped voltage signal from the variable pulse signal generating circuit 2 outputs, to the G terminal of the power semiconductor element Q1. At that time, the driving frequency of the power semiconductor element Q1 serves as the operating frequency of the resonant type high frequency power supply device, and is determined by a setting made on the oscillator circuit disposed in the variable pulse signal generating circuit 2.

As mentioned above, because the resonant type high frequency power supply device in accordance with this Embodiment 1 is configured in such a way as to include the variable inductor L2 that can set the voltage amplitude of the output voltage Vout to an arbitrary value through an adjustment to the L value thereof a variable capacitor becomes unnecessary. Further, downsizing of the device and a cost reduction can be achieved, and superiority in the resistance to a temperature change and a mechanical environment is obtained and stable performance can be maintained in the operation at a high frequency exceeding 2 MHz.

Further, although the case in which the high frequency pulse drive circuit 1, the variable pulse signal generating circuit 2 and the bias power supply circuit 3 are used in order to drive the power semiconductor element Q1 is shown in FIG. 1, this embodiment is not limited to this example. For example, a drive circuit of transformer type 101, an RF power amplifier circuit 102 and a multi-output power supply circuit 103 can be alternatively used, like in the case of using the conventional technology.

Figure 5:
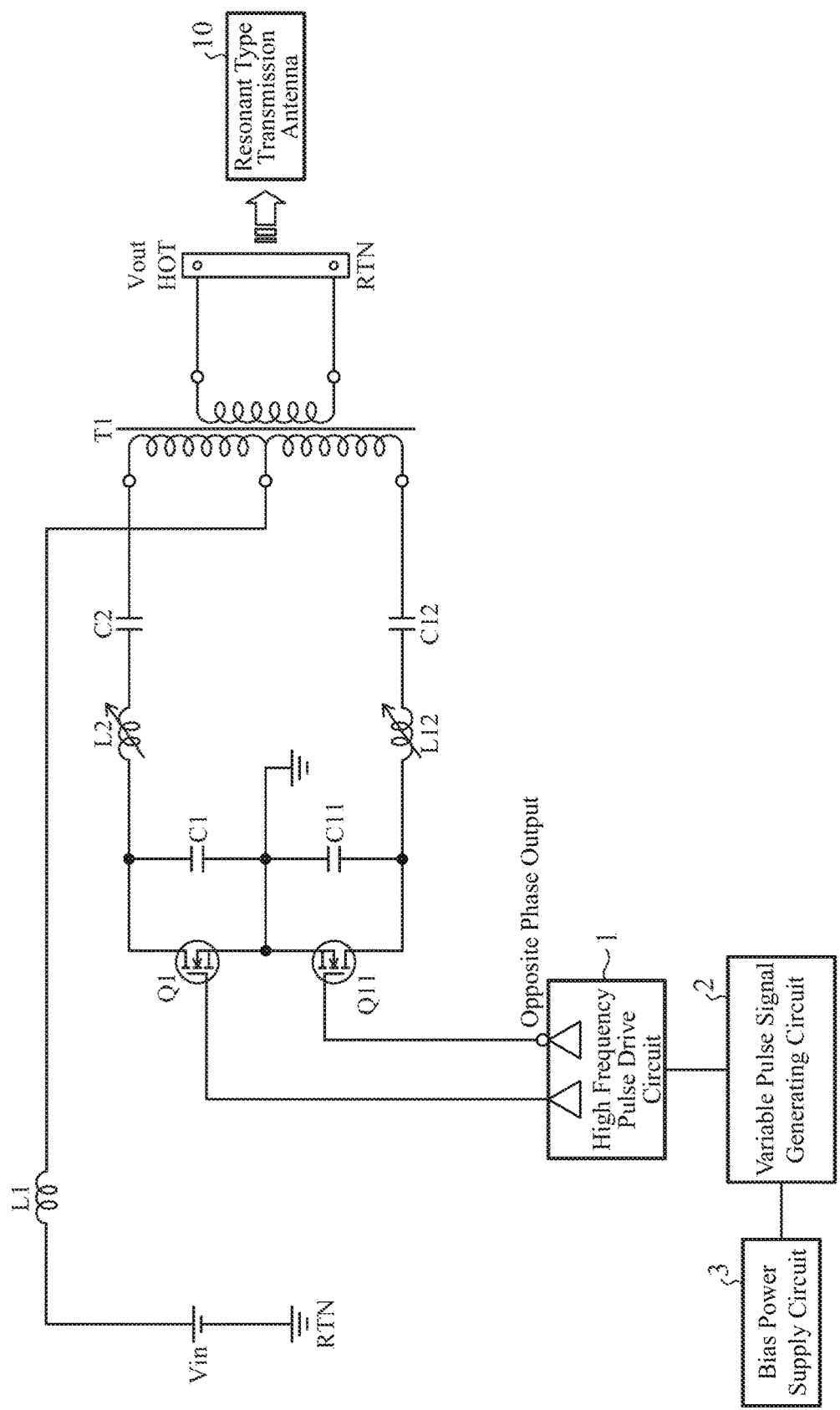
FIG. 5 is a diagram showing another example of the configuration of the resonant type high frequency power supply device in accordance with Embodiment 1 of the present invention (in a case in which the power semiconductor elements have a push-pull configuration)

Further, although the circuit in the case in which the power semiconductor element Q1 has a single configuration is shown in FIG. 1, this embodiment is not limited to this example. For example, as shown in FIG. 5, the present invention can be similarly applied to a case in which the power semiconductor element Q1 has a push-pull configuration.

Figure 6:
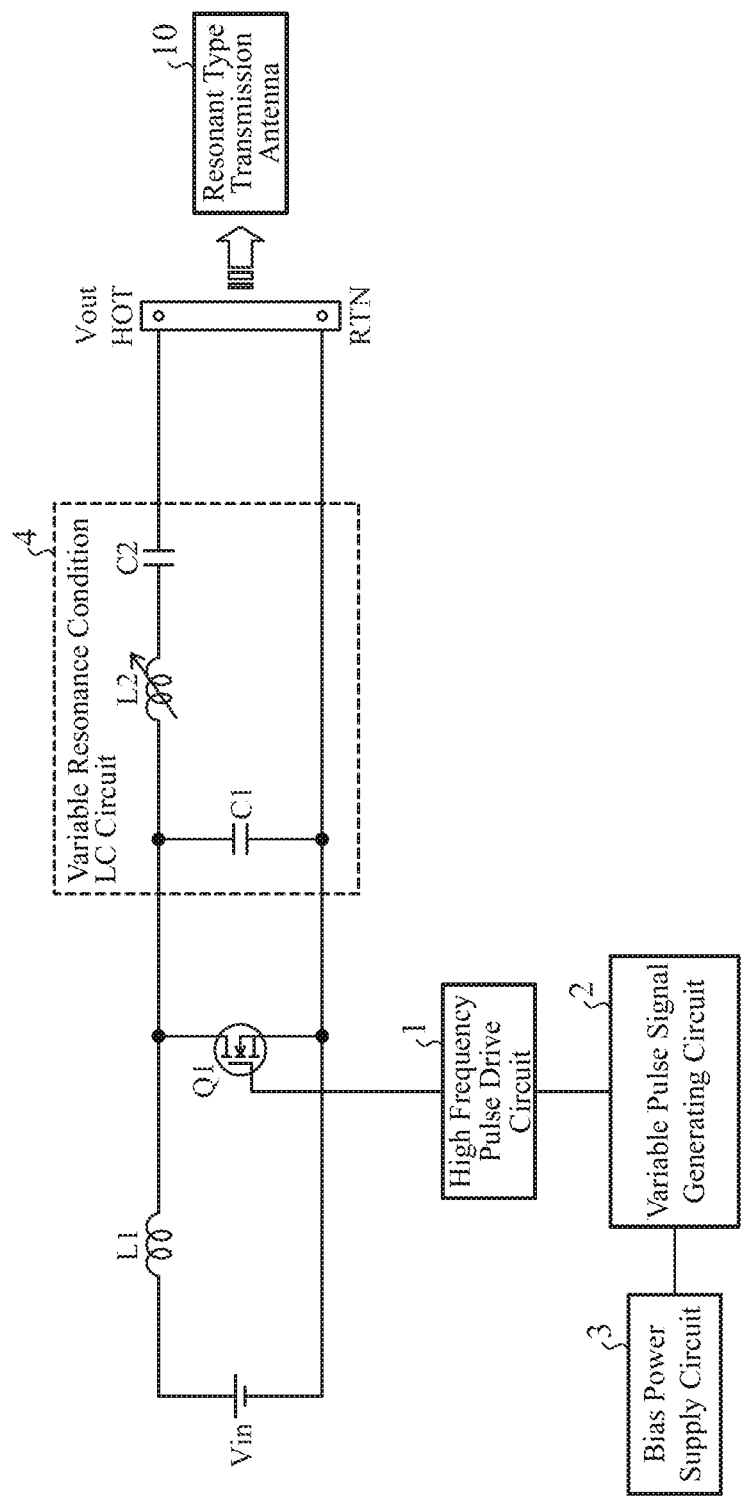
FIG. 6 is a diagram showing another example of the configuration of the resonant type high frequency power supply device in accordance with Embodiment 1 of the present invention (in a case in which a variable resonance condition LC circuit is disposed)
Figure 7:
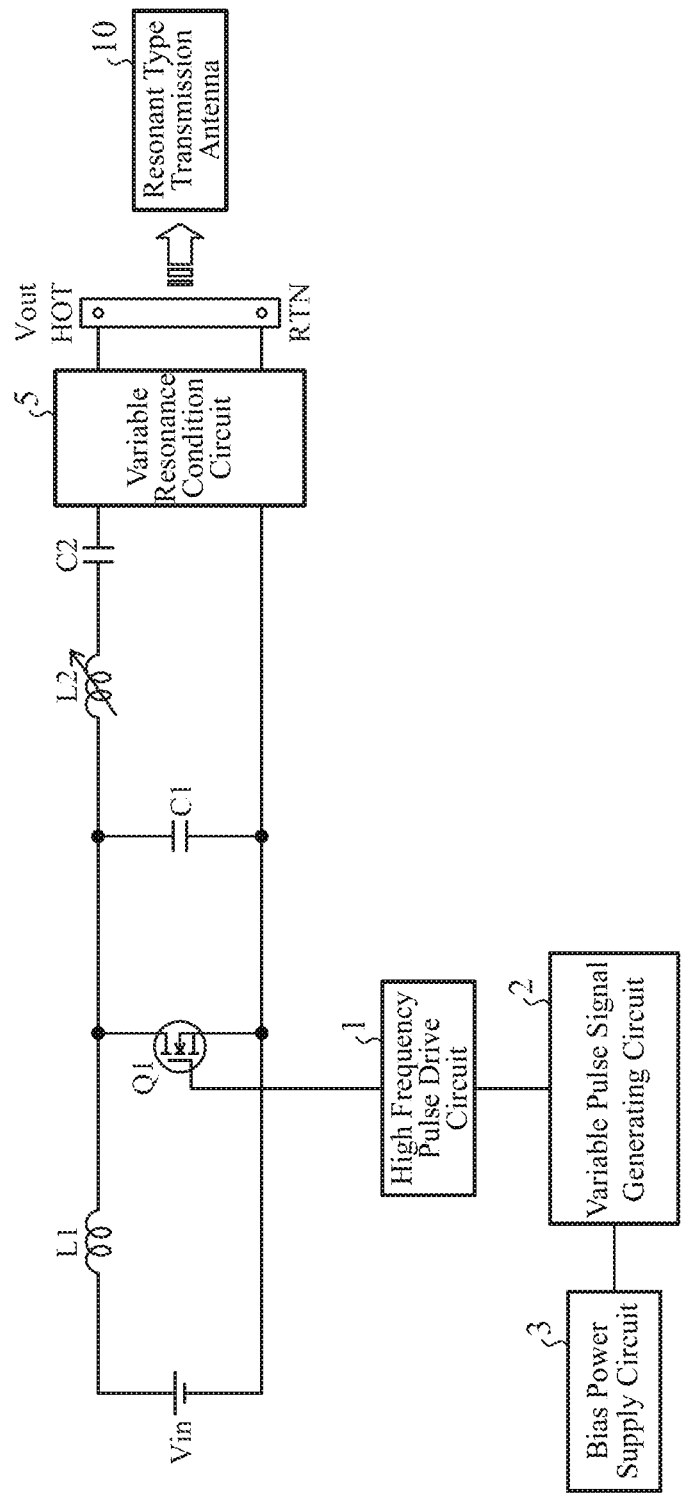
FIG. 7 is a diagram showing another example of the configuration of the resonant type high frequency power supply device in accordance with Embodiment 1 of the present invention (in a case in which a variable resonance condition circuit is disposed)
Figure 8:
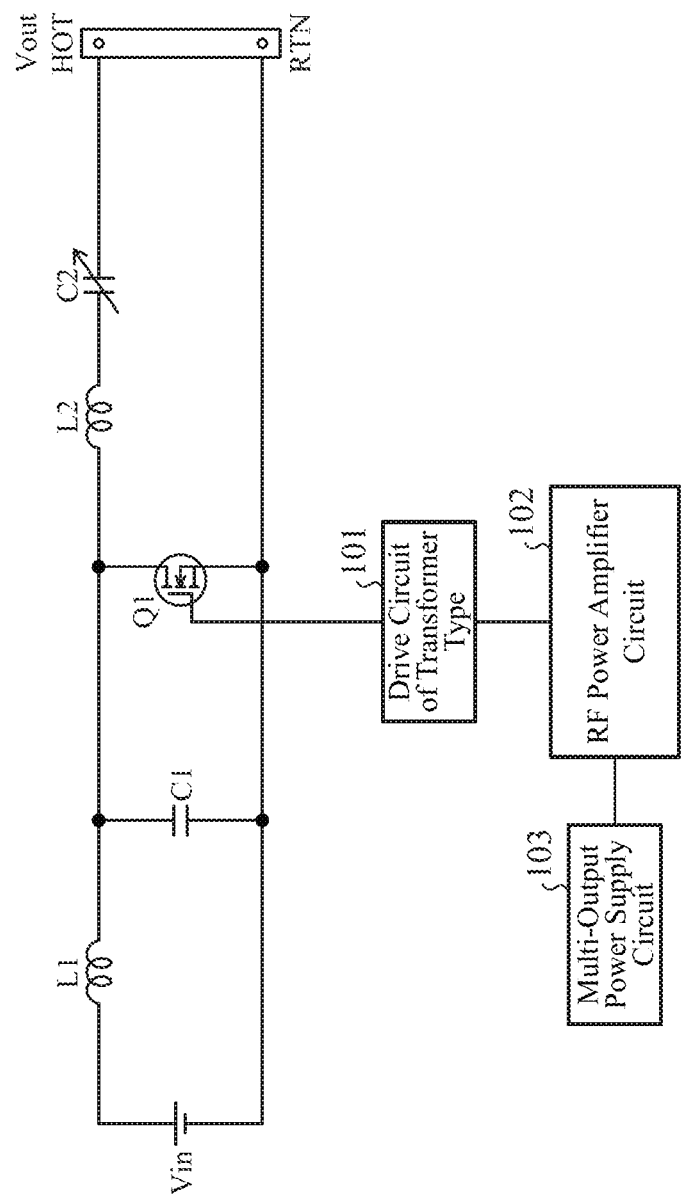
FIG. 8 is a diagram showing the configuration of a conventional resonant type high frequency power supply device.

Further, although the explanation is made as to FIG. 1 by assuming that the constants of the resonance circuit element (the capacitors C1 and C2 and the inductor L2) are fixed and the resonance condition is fixed, this embodiment is not limited to this example. For example, as shown in FIG. 6, a variable resonance condition LC circuit 4 that causes the resonance condition to be variable can be alternatively used. Further, for example, as shown in FIG. 7, a variable resonance condition circuit 5 that causes the resonance condition according to the above-mentioned resonance circuit element (the capacitors C1 and C2 and the inductor L2) to be variable can be disposed separately.

Further, while the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

The resonant type high frequency power supply device in accordance with the present invention makes an adjustment to the amplitude of the output voltage without using a variable capacitor, thereby achieving downsizing thereof and a cost reduction, and that is superior in its resistance to a temperature change and a mechanical environment, and can maintain stable performance and operate at a high frequency exceeding 2 MHz, and is suitable for use as a resonant type high frequency power supply device or the like that performs power transmission at a high frequency.

EXPLANATIONS OF REFERENCE NUMERALS

1 high frequency pulse drive circuit, 2 variable pulse signal generating circuit, 3 bias power supply circuit, 4 variable resonance condition LC circuit, 5 variable resonance condition circuit, 10 resonant type transmission antenna (transmission antenna for power transmission), 21 coil, 22 magnetic path length adjustment mechanism, 23 L value control power supply, and 24 magnetic material.

The invention claimed is:

1. A high frequency power supply device, comprising:
   a power element that performs a switching operation to generate a high frequency output voltage exceeding 2 MHz;
   a high frequency pulse drive circuit that drives said power element by applying a pulse-shaped driving voltage to said power element;
   a variable pulse signal generating circuit that provides a pulse-shaped voltage signal for said high frequency pulse drive circuit to generate said pulse-shaped driving voltage;
   a bias power supply circuit that supplies driving power to said variable pulse signal generating circuit and said high frequency pulse drive circuit; and
   a variable inductor to adjust an amplitude of a device output voltage, said variable inductor including a coil having a length, the variable inductor adjusting by changing the length of said coil.

2. The high frequency power supply device according to claim 1, wherein:
   said power element is a Si-MOSFET, a SiC-MOSFET or a GaN-FET.

3. The high frequency power supply device according to claim 1, wherein:
   said power element includes a push-pull type configuration or a single type configuration.

4. The high frequency power supply device according to claim 1, further comprising:
   a variable impedance matching circuit including a variable capacitor and said variable inductor.

5. The high frequency power supply device according to claim 1, wherein:
   the changing the length of the coil changes a distance between ends of the coil.

* * * * *